(12) United States Patent
Nagata et al.

(10) Patent No.: US 12,728,932 B2
(45) Date of Patent: Sep. 8, 2026

(54) METHODS, SYSTEMS, AND DEVICES FOR RECONFIGURING AND/OR EXTENDING A BED OF A VEHICLE

(71) Applicant: Toyota Motor Engineering & Manufacturing North America, Inc., Plano, TX (US)

(72) Inventors: Katsumi Nagata, Foster City, CA (US); John Grover, Saline, MI (US); Eric R. Schmidt, Ypsilanti, MI (US); Braden M. Klish, Farmington Hills, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 329 days.

(21) Appl. No.: 18/632,771

(22) Filed: Apr. 11, 2024

(65) Prior Publication Data

US 2025/0319932 A1 Oct. 16, 2025

(51) Int. Cl.

| | |
|---|---|
| ***B62D 33/027*** | (2006.01) |
| ***B60Q 1/24*** | (2006.01) |
| ***B60Q 1/30*** | (2006.01) |
| ***B62D 33/08*** | (2006.01) |

(52) U.S. Cl.

CPC ........... *B62D 33/027* (2013.01); *B60Q 1/247* (2022.05); *B60Q 1/30* (2013.01); *B62D 33/08* (2013.01)

(58) Field of Classification Search

CPC ...... B62D 33/027; B62D 33/08; B60Q 1/247; B60Q 1/30

See application file for complete search history.

(56) References Cited

U.S. PATENT DOCUMENTS

| | | | |
|---|---|---|---|
| 6,543,975 B2 | 4/2003 | Kopperud | |
| 6,676,182 B2 | 1/2004 | Fitts | |
| 6,764,121 B1 * | 7/2004 | Bauer ................ | B62D 33/0273 296/61 |
| 6,805,392 B2 | 10/2004 | Leitner et al. | |
| 6,971,828 B2 | 12/2005 | Bernardo | |
| 7,111,886 B1 | 9/2006 | Miller et al. | |
| 7,413,231 B1 | 8/2008 | Wood et al. | |
| 9,409,608 B2 | 8/2016 | Waskie et al. | |
| 9,809,142 B1 | 11/2017 | White | |

(Continued)

*Primary Examiner* — Dany E Akakpo

(74) *Attorney, Agent, or Firm* — Snell & Wilmer LLP

(57) ABSTRACT

Methods, systems, and devices for reconfiguring and/or extending a bed of a vehicle. A device may include a base panel coupled to a tailgate of the vehicle. The device may include a top panel moveably attached to the base panel. The device may include a plurality of side wings moveably coupled to the top panel. The plurality of side wings may removably attach to accessory rails of the vehicle to place the device in one or more configurations including a bed extender configuration, a rear bed divider configuration, and/or a front bed divider configuration. The device may include one or more sensors, one or more taillights, one or more puddle lights, one or more bed lights, and/or one or more cameras. The device may have a stowed position wherein the device may fold against the tailgate when the device is not in a configuration of the one or more configurations.

20 Claims, 8 Drawing Sheets

(56) References Cited

U.S. PATENT DOCUMENTS

| | | | | |
|---|---|---|---|---|
| 10,494,037 | B2 | 12/2019 | Williams | |
| 10,611,414 | B2 | 4/2020 | Singer | |
| 11,345,416 | B2 | 5/2022 | McMeans | |
| 11,511,816 | B1 | 11/2022 | Vanduzer | |
| 2007/0236035 | A1 | 10/2007 | Waldner | |
| 2012/0228893 | A1 | 9/2012 | Lu et al. | |
| 2019/0329713 | A1 * | 10/2019 | Sharma ................ | B62D 33/023 |
| 2023/0136294 | A1 | 5/2023 | Bauer | |

* cited by examiner 320
308
220b
206
220a
208a
208b
306
218
210b
104
204
304
210a

METHODS, SYSTEMS, AND DEVICES FOR RECONFIGURING AND/OR EXTENDING A BED OF A VEHICLE

BACKGROUND

1. Field

The present disclosure relates to methods, systems, and/or devices for reconfiguring and/or extending a bed of a vehicle.

2. Description of the Related Art

Various products are available to reconfigure a bed of a vehicle (e.g., a pickup truck). These products include standalone bed dividers and bed extenders. However, prior standalone bed dividers and bed extenders are bulky, only serve their respective single purpose, and do not have a compact on vehicle storage solution when not in use. Thus, the prior bed dividers and bed extenders are not able to adapt to different tasks and must be removed from the vehicle when not in use to avoid the prior bed dividers and bed extenders from interfering with other tasks. This is inconvenient to users because the prior bed extenders and bed dividers may have to be repeatedly installed and removed from the vehicle and require storage when not installed on the vehicle.

Accordingly, it is desirable to provide methods, systems, and devices for reconfiguring and/or extending a bed of a vehicle.

SUMMARY

In general, one aspect of the subject matter described in this disclosure may be embodied in a tailgate device for a vehicle. The tailgate device may include a left wall, a right wall, and a front wall defining a truck bed. The truck bed may have a rear end portion opposite of the front wall. The truck bed may further have a left accessory rail (or a left mechanical connection point) coupled to the left wall and a right accessory rail (or a right mechanical attachment point) coupled to the right wall. The tailgate device may further include a tailgate coupled to the rear end portion of the truck bed. The tailgate may have an interior surface and may close to enclose the truck bed and open such that the tailgate does not enclose the truck bed. The tailgate device may further include a base panel coupled to the interior surface such that the base panel covers the interior surface. The base panel may have a left side edge and a right side edge opposite the left side edge. The tailgate device may further include a top panel moveably attached to the base panel. The top panel may have a left side edge and a right side edge opposite the left side edge. The top panel may close such that the top panel covers the base panel, and open such that the left side edge and the right side edge of the top panel are perpendicular to the left side edge and the right side edge of the base panel, respectively. The tailgate device may further include one or more left side wings moveably coupled to the left side edge of the top panel. The one or more left side wings may close by swinging toward the top panel and open by swinging away from the top panel. The one or more left side wings may further removably attach to the left accessory rail when open. The tailgate device may further include one or more right side wings moveably coupled to the right side edge of the top panel. The one or more right side wings may close by swinging toward the top panel and open by swinging away from the top panel. The one or more right side wings may further removably attach to the right accessory rail when open.

In one aspect, the subject matter may be embodied in a tailgate device for a vehicle. The tailgate device may include a truck bed having a plurality of accessory rails coupled to sides of the truck bed. The tailgate device may further include a plurality of adapters configured to removably attach to the plurality of accessory rails. The tailgate device may further include a tailgate having an interior surface. The tailgate may open and close. The tailgate device may further include a base panel coupled to the interior surface. The base panel may have a left side edge and a right side edge opposite the left side edge. The tailgate device may further include a top panel moveably coupled to the base panel. The top panel may have a left side edge and a right side edge opposite the left side edge. The top panel may close such that the top panel covers the base panel and open such that the left side edge and the right side edge of the top panel are perpendicular to the left side edge and the right side edge of the base panel, respectively. The tailgate device may further include one or more left side wings moveably coupled to the left side edge of the top panel. The one or more left side wings may close by swinging toward the top panel and open by swinging away from the top panel. The one or more left side wings may further removably attach, via an adapter of the plurality of adapters, to an accessory rail of the two or more accessory rails when the one or more left side wings are open. The tailgate device may further include one or more right side wings moveably coupled to the right side edge of the top panel. The one or more right side wings may close by swinging toward the top panel and open by swinging away from the top panel. The one or more right side wings may further removably attach, via another adapter of the plurality of adapters, to another accessory rail of the two or more accessory rails when the one or more right side wings are open.

BRIEF DESCRIPTION OF THE DRAWINGS

Other systems, methods, features, and advantages of the present disclosure will be apparent to one skilled in the art upon examination of the following figures and detailed description. Component parts shown in the drawings are not necessarily to scale and may be exaggerated to better illustrate the important features of the present disclosure. In the drawings, like reference numerals designate like parts throughout the different views.

DETAILED DESCRIPTION

Disclosed herein are methods, systems, devices, and/or vehicles for implementing a tailgate device for reconfigurable bed storage of a vehicle. The tailgate device may couple to a tailgate of the vehicle and may extend and/or divide a bed of the vehicle. Particular embodiments of the subject matter described in this disclosure may be implemented to realize one or more of the following advantages. The tailgate device may reconfigure and/or extend the bed of the vehicle by having one or more configurations. The one or more configurations may include a bed extender configuration, a rear bed divider configuration, and/or a front bed divider configuration. This allows the tailgate device to replace two to three standalone bed extenders and bed dividers and thus is more compact and convenient than the standalone bed extenders and bed dividers. Moreover, the tailgate device may have a detachable top panel such that a user may easily and quickly position the tailgate device into a configuration of the one or more configurations.

Moreover, the tailgate device has a compact and slim profile when in use and when not in use by including embossed sections and by utilizing space within service holes of the tailgate. When the tailgate device is not in use, the tailgate device may fold against the tailgate in a compact stowed position. This enables a user to keep the tailgate device on the vehicle even when the tailgate device is not in use without the worry that the tailgate device will interfere with other uses of the bed. When the tailgate device is in use, the tailgate device has a square and slim profile that is more practical than other rounded tailgate extenders because the square profile provides a greater area of extension and a more convenient shape to fit various items in the bed (e.g., a 4×8 board).

Figure 1:
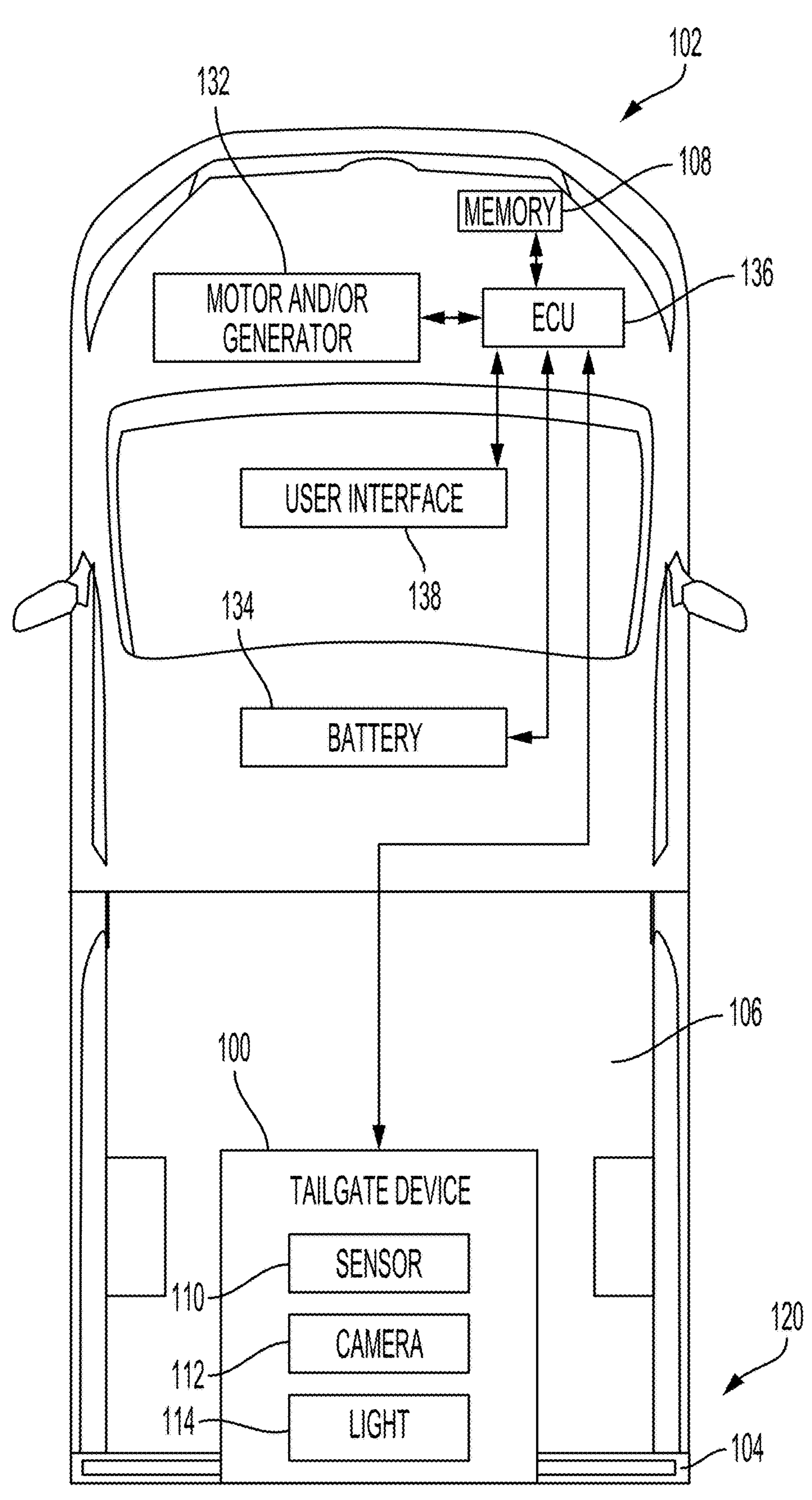
FIG. 1 is a schematic of an example vehicle with which an example tailgate device may be implemented according to an aspect of the disclosure.

FIG. 1 illustrates an example vehicle 102 in which an example tailgate device 100 (also may be referred to as an extendable (or reconfigurable) bed device 100) may be implemented. The tailgate device 100 may be retrofitted, coupled to, include, or be included within the vehicle 102 or separate from the vehicle 102. The vehicle 102 may be a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor, an engine, and/or a generator. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors and/or a navigation unit to drive autonomously.

The vehicle 102 may include a motor and/or generator 132 and a battery 134. The motor and/or generator 132 may be located within an engine bay of the vehicle 102. The motor and/or generator 132 may be an internal combustion engine (ICE). In this regard, the motor and/or generator 132 may combust an air and fuel mixture to provide power to the vehicle 102 and/or components of the vehicle 102 and/or the tailgate device 100. Accordingly, the motor and/or generator 132 can cause the vehicle 102 to accelerate, decelerate, or maintain a desired velocity. It should be understood that the motor and/or generator 132 may include combinations of an ICE and an electric motor, such as for hybrid vehicle applications for example. In examples, the motor and/or generator 132 may be an electric motor. In this regard, the motor and/or generator 132 may be an electric motor and an electric generator that converts electrical energy into mechanical power, such as torque, and converts mechanical power into electrical energy. The motor and/or generator 132 may be electrically connected to the battery 134. The motor and/or generator 132 may convert energy from the battery 134 into mechanical power, and may provide energy back to the battery 134, for example, via regenerative braking. The battery 134 may be electrically connected to the motor and/or generator 132 and may provide electrical energy to and/or receive electrical energy from the motor and/or generator 132. The battery 134 may provide electrical energy to the tailgate device 100.

Figure 2:
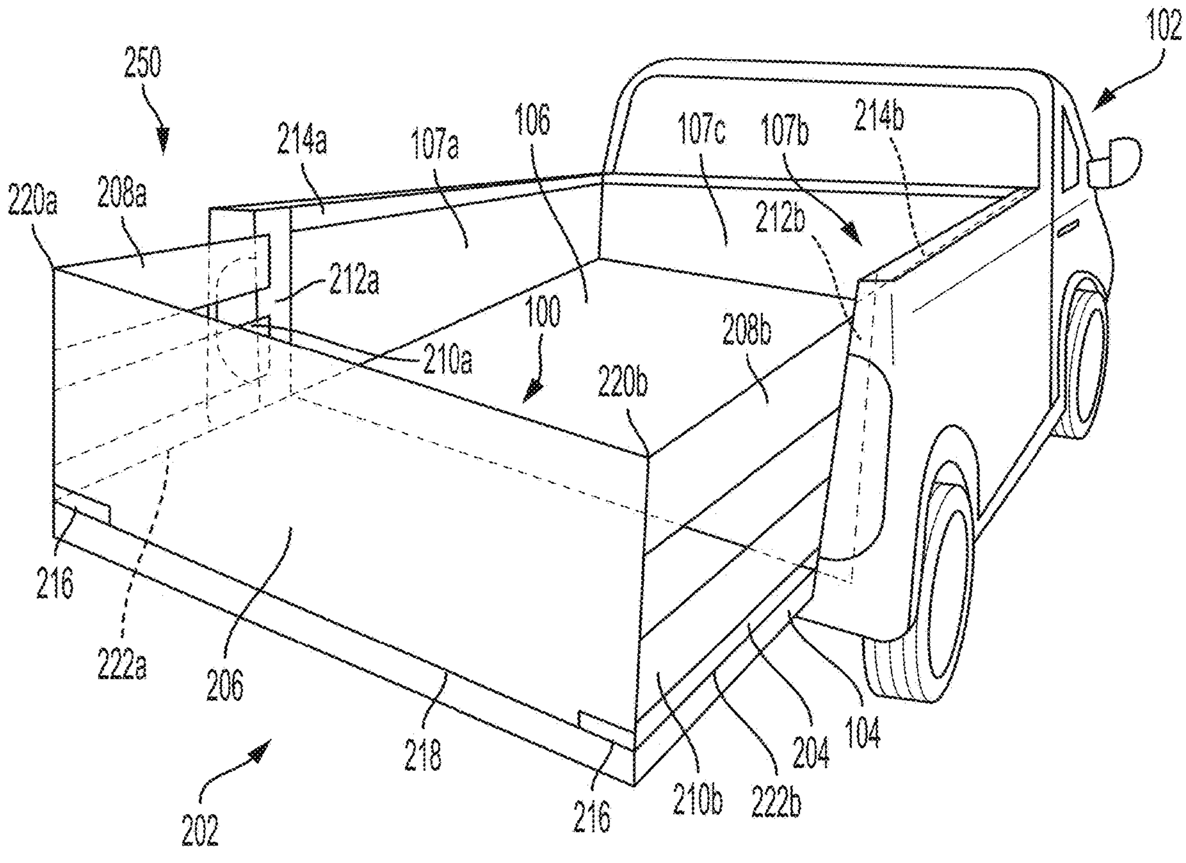
FIG. 2 is a schematic perspective view of an example vehicle including the tailgate device of FIG. 1 according to an aspect of the disclosure.

FIG. 2 is an illustration of the vehicle 102 including the tailgate device 100 of FIG. 1. With combined reference to FIGS. 1 and 2, the vehicle 102 and/or the tailgate device 100 may further include a tailgate 104, a bed (or truck bed) 106, and/or a plurality of accessory rails (or mechanical connection points). The tailgate 104 may be coupled to the rear of the vehicle 102. The tailgate 104 may be configured to open and close and may have an open state 202 and a closed state 120. The bed 106 may have a plurality of bed panels (or bed sides/walls) including a left bed panel 107*a*, a right bed panel 107*b*, and/or a front bed panel 107*c*. The bed 106 may have a front portion and a rear portion opposite of the front portion and/or the front bed panel 107*c*. In the closed state 120, the tailgate 104 may be removably coupled to the left bed panel 107*a* and the right bed panel 107*b* to enclose the bed 106.

The plurality of accessory rails may include a left accessory rail 214*a* and/or a right accessory rail 214*b*. The left accessory rail 214*a* may be coupled to the left bed panel 107*a*. The right accessory rail 214*b* may be coupled to the right bed panel 107*b*. The plurality of accessory rails 214*a*, 214*b* may be configured as attachment points within the bed 106 for attaching (or securing) one or more accessories (e.g., tie downs, toolboxes, tonneau covers, etc.) to the bed 106. In examples, the plurality of accessory rails may be and/or include one or more mechanical connection points (e.g., a hook, a rail, an anchor, a bolt hole, etc.) coupled to the left bed panel 107*a* and/or the right bed panel 107*b*.

The tailgate device 100 may be movably coupled to the tailgate 104. The tailgate device 100 may include a top panel (or tailgate panel) 206, a base (or bottom panel or base panel) 204, a plurality of side panels (or a plurality of side wings), and/or a plurality of mounting bars (or a plurality of adapters).

The base 204 may be coupled to the tailgate 104. The base 204 may replace a cover (or panel) of the tailgate 104 when the base 204 is coupled to the tailgate 104. In examples, the base 204 does not replace the cover (or panel) of the tailgate 104 when the base 204 is coupled to the tailgate 104. The base 204 may be substantially rectangular. The base 204 may include a left side edge 222*a* and a right side edge 222*b* opposite the left side edge 222*a* defining a width of the base 204. The base 204 may be made from and/or of aluminum, steel, magnesium, plastic, reinforced plastics, and/or other composite materials.

The top panel 206 may be moveably attached (or coupled) to the base 204 at a rear edge (or portion) 218 of the base 204 such that the top panel 206 may cover, lay atop, and/or alongside the base 204 (i.e., a length of the top panel 206 may be parallel with a length of the base 204), which is discussed in more detail below with reference to FIG. 3A. Moreover, the top panel 206 may open by rotating up and away from the base 204 until the length of the top panel 206 is perpendicular to the length of the base 204, which is discussed in more detail below with reference to FIG. 3B. In examples, the top panel 206 may be moveably coupled to the base 204 by one or more hinges 216 located along the rear edge 218 of the base 204, which is discussed in more detail below with reference to FIGS. 11A and 11B. The top panel 206 may be substantially rectangular. The top panel 206 may have an interior face that faces toward the front bed panel 107*c* when the tailgate 104 is in the open state 202 and the top panel 206 is open. The top panel 206 may be made from and/or of aluminum, steel, magnesium, plastic, reinforced plastics, and/or other composite materials.

The plurality of side panels may include a top left side panel (or top left side wing) 208*a*, a top right side panel (or top right side wing) 208*b*, a bottom left side panel (or bottom left side wing) 210*a*, and/or a bottom right side panel (or bottom right side wing) 210*b*. In examples, the plurality of side panels may include only two side panels. The plurality of side panels 208*a*, 208*b*, 210*a*, and 210*b* may be moveably coupled (e.g., via hinges) to the top panel 206 such that the plurality of side panels 208*a*, 208*b*, 210*a*, and 210*b* may each rotate from a closed (or stowed) position were a length of each side panel of the plurality of side panels 208*a*, 208*b*, 210*a*, and 210*b* is parallel to a width of the top panel 206, to a second (or open) position were the length of the each side panel is perpendicular to the width of the top panel 206 (as shown in FIG. 2). The top left side panel 208*a* and the bottom left side panel 210*a* may each be moveably coupled to the top panel 206 along a left edge (or portion) 220*a* of the top panel 206. The top right side panel 208*b* and the bottom right side panel 210*b* may each be moveably coupled to the top panel 206 along a right side edge (or portion) 220*b* of the top panel 206, the right side edge 220*b* being opposite the left side edge 220*a* and defining the width of the top panel 206. The plurality of side panels 208*a*, 208*b*, 210*a*, and 210*b* may removably attach the top panel 206 to the plurality of mounting bars to enclose and/or extend the bed 106 when the tailgate 104 is in the open state 202 (as shown by FIG. 2). The plurality of side panels 208*a*, 208*b*, 210*a*, and 210*b* may be made from and/or of aluminum, steel, magnesium, plastic, reinforced plastics, and/or other composite materials.

The plurality of mounting bars may include a left mounting bar 212*a* and/or a right mounting bar 212*b*. The plurality of mounting bars 212*a* and 212*b* may be removably attached to the bed 106 and/or the plurality of accessory rails 214*a* and 214*b*. The plurality of mounting bars 212*a* and 212*b* may provide attachment points for removably attaching the plurality of side panels 208*a*, 208*b*, 210*a*, and 210*b* to the plurality of mounting bars 212*a* and 212*b*. In examples, the plurality of mounting bars 212*a* and 212*b* may be and/or function as adapter pieces to enable the plurality of side panels 208*a*, 208*b*, 210*a*, and 210*b* to be removably attached to accessory rails of various vehicles via the same plurality of mounting bars 212*a* and 212*b* or a different plurality of mounting bars that are adapted for a specific accessory rail of a specific vehicle. This increases the compatibility of the tailgate device 100 with various vehicles by allowing the plurality of side panels 208*a*, 208*b*, 210*a*, and 210*b* to be removably attached to various types of accessory rails via the same plurality of mounting bars 212*a* and 212*b*, or by only having to change out the plurality of mounting bars 212*a* and 212*b* instead of having to change the entire tailgate device 100. In examples, the plurality of mounting bars 212*a* and 212*b* may be coupled, and not removably attached, to the plurality of side panels 208*a*, 208*b*, 210*a*, and 210*b* such that the plurality of mounting bars 212*a*, 212*b* are integral to the plurality of side panels 208*a*, 208*b*, 210*a*, and 210*b*. The plurality of mounting bars 212*a* and 212*b* may be made from and/or of aluminum, steel, magnesium, plastic, reinforced plastics, and/or other composite materials.

Figure 3A:
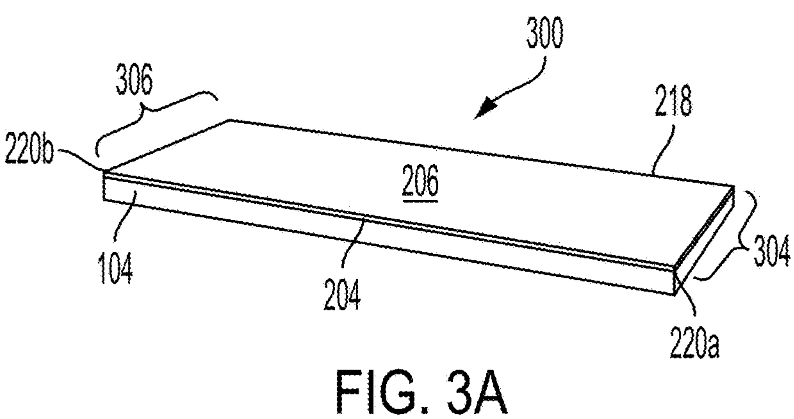
FIGS. 3A-3C are schematic perspective views of the tailgate device of FIG. 1 according to an aspect of the disclosure.
Figures 3B, 3C:
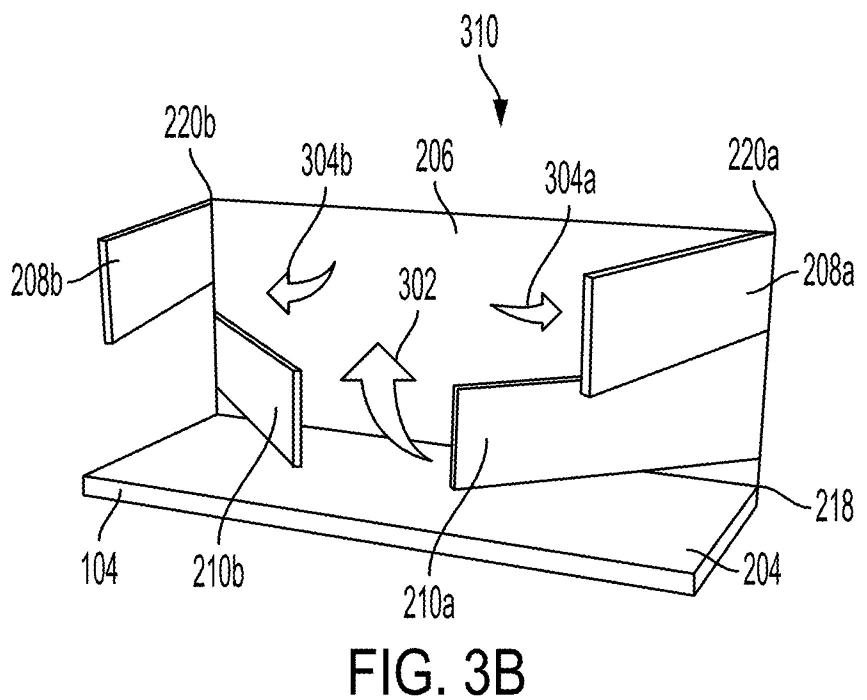

FIGS. 3A, 3B, and 3C illustrate the tailgate device 100 in a stowed position (or state) 300, an opening position (or state) 310, and an open position (or state) 320, respectively, with only the tailgate 104 of the vehicle 102 pictured to better illustrate certain features of the tailgate device 100. With combined reference to FIGS. 2 and 3A-3C, the tailgate device 100 may have a plurality of positions. The plurality of positions may include the stowed position 300 (as shown by FIG. 3A), the opening position 310 (as shown by FIG. 3B), and an open position 320 (as shown by FIG. 3C). In the stowed position 300 (also can be referred to as a closed position), the tailgate device 100 may be substantially flat against the tailgate 104 such that a length 306 of the top panel 206 may be parallel with a length 304 of the base 204, with the plurality of side panels 208*a*, 208*b*, 210*a*, and 210*b* folded against the top panel 206 and positioned between the top panel 206 and the base 204. In examples, the tailgate device 100 may be retained in the stowed position 300 by clips, latches, thumb screws, and/or other quick release retention mechanisms such that the tailgate device 100 will not open accidently during driving and/or operation of the tailgate 104 by a user.

From the stowed position 300, the tailgate device 100 may be manipulated by a user into the opening position 310 by lifting the top panel 206 such that the top panel 206 swings upward and/or away from the base 204 in an opening direction 302, by lifting and/or swinging the top left side panel 208*a* and the bottom left side panel 210*a* outward from the top panel 206 in a left (or first) outwardly (or opening) direction 304*a*, and by lifting and/or swinging the top right side panel 208*b* and the bottom right side panel 210*b* outward from the top panel 206 in a right (or second) outwardly (or opening) direction 304*b*.

From the opening position 310, the user may manipulate the tailgate device 100 into the open position 320 by lifting and/or swinging the top panel 206 in the opening direction 302 and the plurality of side panels 208*a*, 208*b*, 210*a*, and 210*b* in the respective outward directions 304*a* and 304*b* until the length 306 of the top panel 206 is substantially perpendicular to the length 304 of the base 204 and/or a length 308 of each side panel of the plurality of side panels 208*a*, 208*b*, 210*a*, and 210*b* is parallel with the length 304 of the base 204. In examples, retention devices along the rear edge 218, the left side edges 220*a* and 222*a*, and/or the right side edges 220*b* and 222*b* may retain the tailgate device 100 in the open position 320 until a user manipulates the tailgate device 100. The user may return the tailgate device 100 to the stowed position 300 by folding the plurality of side panels 208*a*, 208*b*, 210*a*, and 210*b* towards the top panel 206 and the top panel 206 towards the base 204.

Figure 4:
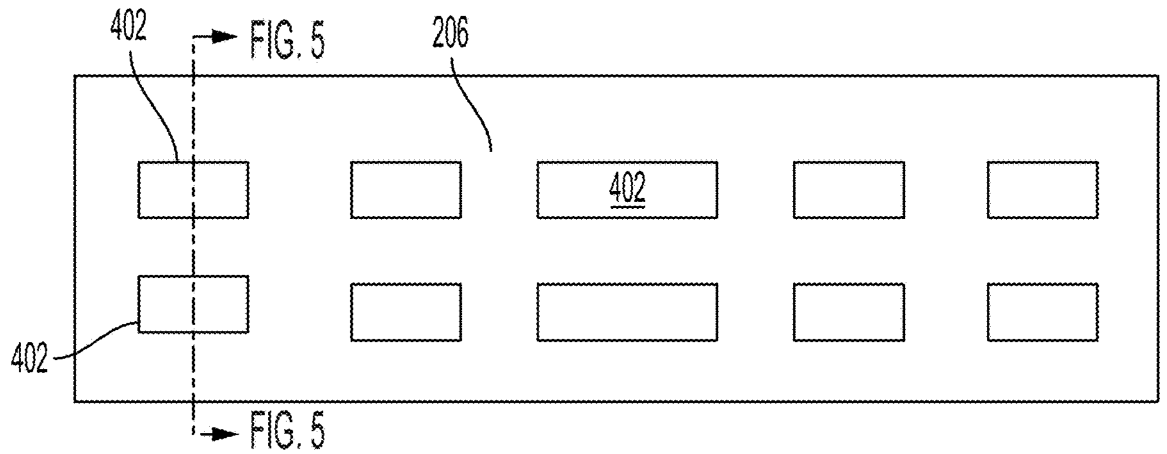
FIG. 4 is a schematic illustrating structural features of the tailgate device of FIG. 1 according to an aspect of the disclosure.
Figure 5:
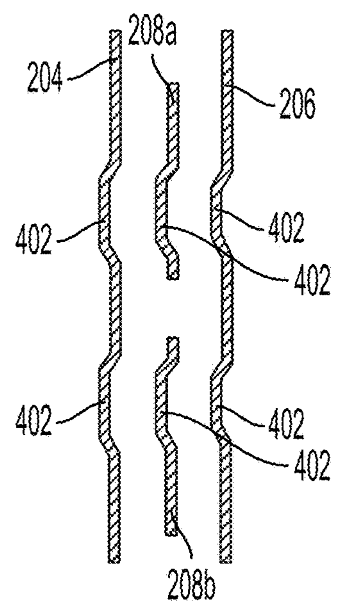
FIG. 5 is a schematic cross-sectional view of FIG. 4 according to an aspect of the disclosure.

FIGS. 4 and 5 illustrate structural features of the tailgate device 100. With combined reference to FIGS. 3A, 4, and 5, the tailgate device 100 may have one or more embossed sections 402. The one or more embossed sections 402 may increase the strength and/or stiffness of the tailgate device 100. In addition, the one or more embossed sections 402 enables the tailgate device 100 to have a compact and slim profile while increasing the strength and/or stiffness of the tailgate device 100 by being strategically positioned on the tailgate device 100 such that the one or more embossed sections 402 of the top panel 206 align with the one or more embossed sections 402 of the plurality of side panels 208*a*, 208*b*, 210*a*, and 210*b* and the one or more embossed sections 402 of the base 204 when the tailgate device 100 is in the stowed position 300 as shown by FIG. 5. The positioning of the one or more embossed sections 402 on the top panel 206, the base 204, and the plurality of side panels 208*a*, 208*b*, 210*a*, and 210*b* allows the tailgate device 100 to fit together while in the stowed position 300 thereby increasing the strength and/or stiffness of the tailgate device 100 without increasing the overall size, weight, and/or thickness of the tailgate device 100. In examples, the top panel 206 and/or the base 204 may include five or more embossed sections 402 and each side panel of the plurality of side panels 208*a*, 208*b*, 210*a*, and 210*b* may include two or more embossed sections 402.

In examples, the one or more embossed sections 402 enables the tailgate device 100 to have a total thickness of 10-30 mm with a preferred thickness of 18 mm in the stowed position 300 to have an optimal ratio between strength, stiffness, and/or weight. In examples, the top panel 206, the base 204, and/or the plurality of side panels 208*a*, 208*b*, 210*a*, and 210*b* may be 2-6 mm thick with a preferred thickness of 4 mm. In examples, the tailgate device 100 may have a 0-5 mm gap between the top panel 206 and the plurality of side panels 208*a*, 208*b*, 210*a*, and 210*b* when the tailgate device 100 is in the stowed position 300. In examples, the tailgate device 100 may have a 0-5 mm gap between the base 204 and the plurality of side panels 208*a*, 208*b*, 210*a*, and 210*b* when the tailgate device 100 is in the stowed position 300.

Figure 6:
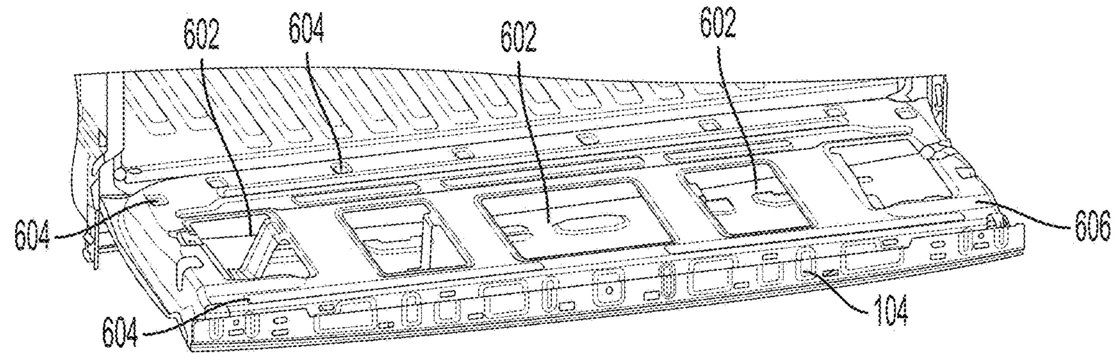
FIG. 6 is a schematic perspective view of an example tailgate of the tailgate device of FIG. 1 according to an aspect of the disclosure.

FIG. 6 illustrates an example tailgate 104. With combined reference to FIGS. 1, 5, and 6, the tailgate 104 may include one or more service holes (or portions) 602 and/or one or more bolt holes (or attachment points) 604. The one or more embossed sections 402 of the base 204 may be positioned and sized such that the one or more embossed sections 402 of the base 204 may fit within the one or more service holes 602 of the tailgate 104. This may have the benefit of reducing the thickness and/or size of the tailgate device 100 while increasing the strength and/or stiffness of the tailgate device 100.

In examples, the tailgate 104 may further include an interior surface 606. The interior surface 606 may face forward with respect to the vehicle 102 when the tailgate 104 is in the closed state 120. When the tailgate device 100 is not installed on the tailgate 104, the interior surface 606 may be covered by a service hole cover with one or more bolts 702 at the one or more bolt holes 604. The interior surface 606 may be a surface of the tailgate 104 that is exposed after removing the service hole cover of the tailgate 104. In examples, the interior surface 606 may be an outer surface of the service hole cover of the tailgate 104. In examples, the base 204 may couple to the interior surface 606 of the tailgate 104. The base 204 may partially or completely cover the interior surface 606 when the tailgate device 100 is coupled to the tailgate 104.

Figure 7:
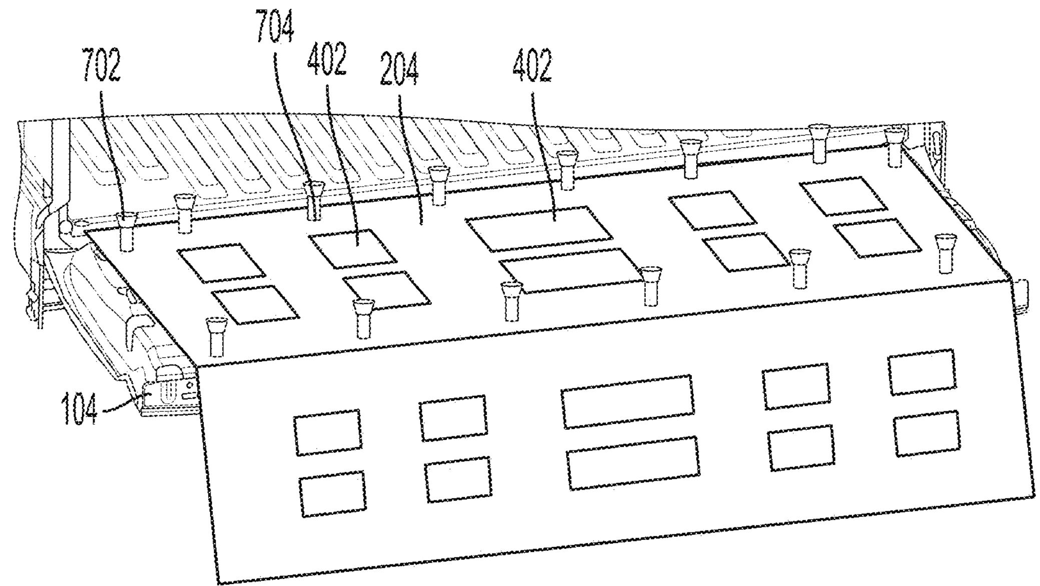
FIG. 7 is a schematic perspective view of the tailgate of FIG. 6 coupled to an example base of the tailgate device of FIG. 1 according to an aspect of the disclosure.

FIG. 7 illustrates the example tailgate 104 of FIG. 6 coupled to the base 204. With combined reference to FIGS. 6 and 7, the tailgate device 100 may include one or more holes 704 that align with the one or more bolt holes 604 of the tailgate 104. The tailgate device 100 may couple to the tailgate 104 by one or more bolts 702 being placed through the one or more holes 704 of the base 204 and threading into the one or more bolt holes 604 of the tailgate 104. In examples, the one or more bolts 702 may be placed within the tailgate 104 when the tailgate 104 is manufactured such that the one or more bolts 702 may be reused to couple the tailgate device 100 to the tailgate 104 to retrofit the tailgate device 100 to the tailgate 104.

Figure 8:
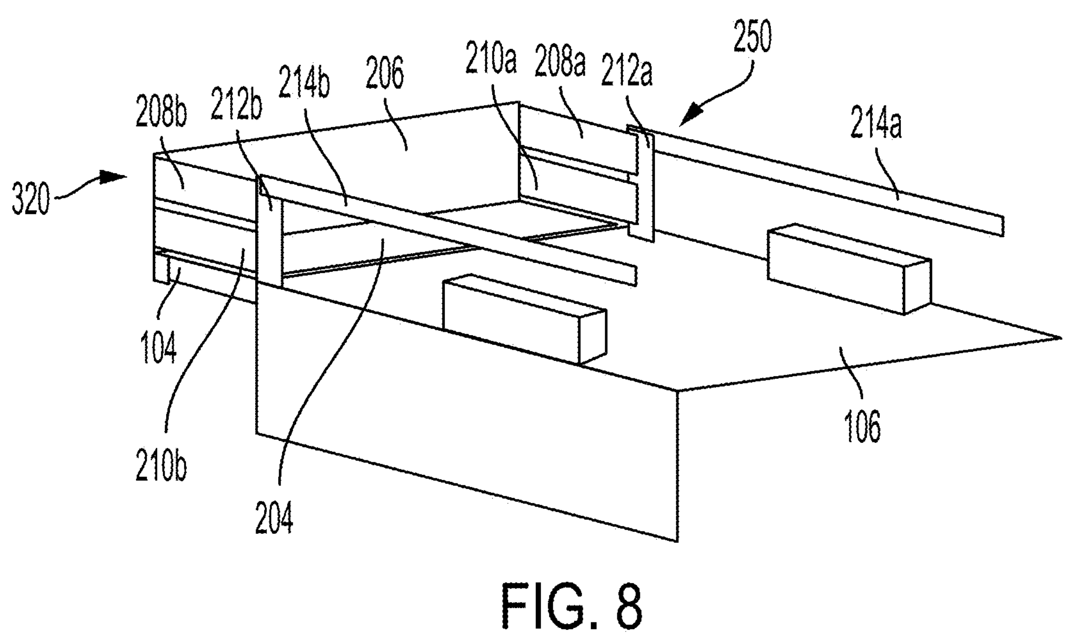
FIGS. 8-10 are schematic perspective views of example configurations of the tailgate device of FIG. 1 according to aspects of the disclosure.
Figure 9:
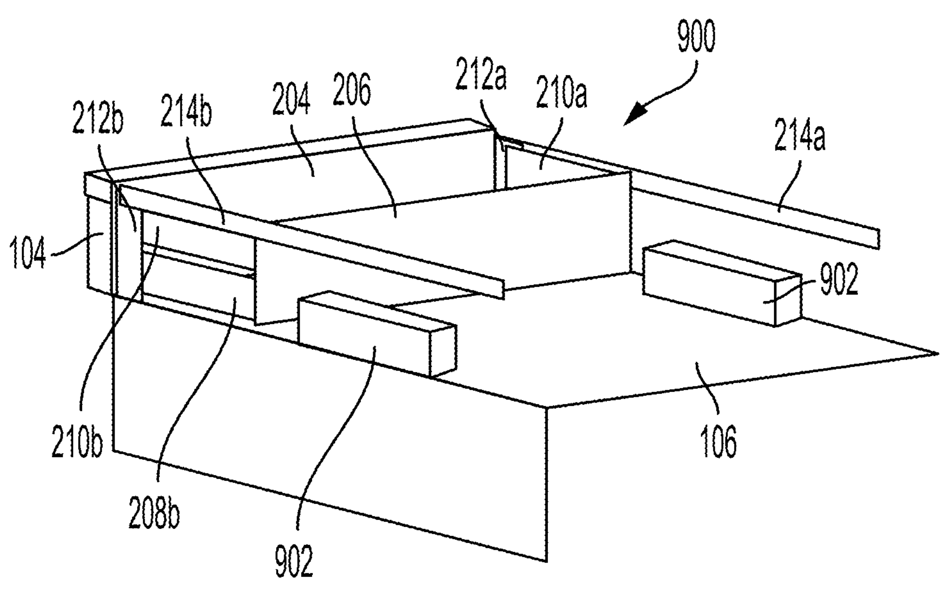
Figure 10:
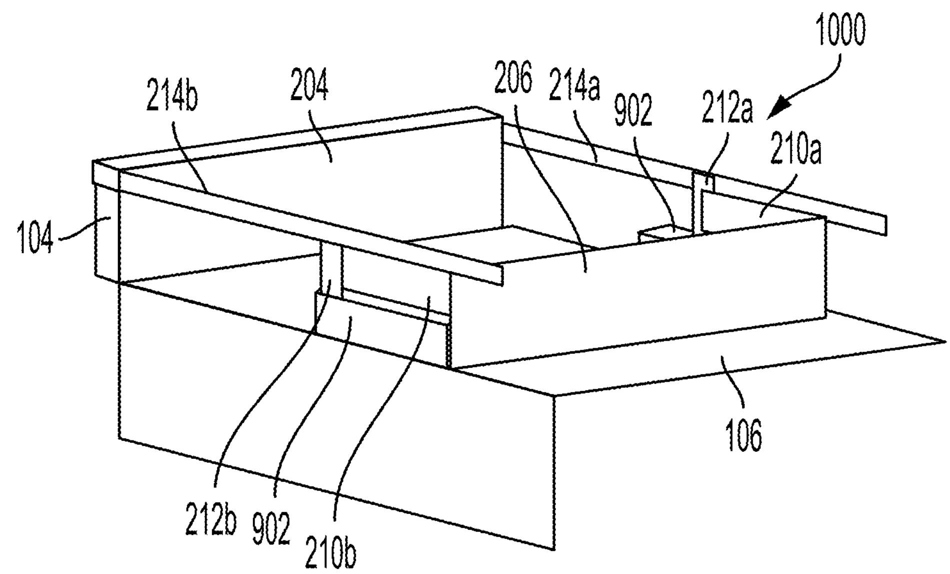

FIGS. 8-10 illustrate the vehicle 102 including the tailgate device 100 with portions of the vehicle 102 not pictured (e.g., the plurality of bed panels 107*a*, 107*b*, and 107*c*) to better illustrate certain features of the tailgate device 100. With combined reference to FIGS. 2 and 8-10, the tailgate device 100 may have one or more configurations (or use cases) that extend and/or divide the bed 106 of the vehicle 102 to aid with storing and/or securing various items within the bed 106. The one or more configurations may include a bed extender configuration 250 (as shown by FIGS. 2 and 8), a rear bed divider configuration 900 (as shown by FIG. 9), and/or a front bed divider configuration 1000 (as shown by FIG. 10). By combining the one or more configurations 250, 900, and 1000 into a single device, the tailgate device 100 saves cost, weighs less, and/or is smaller when compared to separate tailgate extenders and dividers.

The bed extender configuration 250 may extend the bed 106 by enclosing the bed 106 when the tailgate 104 is in the open state 202. To place the tailgate device 100 into the bed extender configuration 250, a user may manipulate the tailgate device 100 into the open position 320 and removably attach the plurality of side panels 208*a*, 208*b*, 210*a*, and 210*b* to the plurality of mounting bars 212*a* and 212*b*, with the plurality of mounting bars 212*a* and 212*b* being removably attached to the plurality of accessory rails 214*a* and 214*b* (as shown by FIGS. 2 and 4). In examples where the plurality of mounting bars 212*a* and 212*b* are coupled and/or integral to the plurality of side panels 208*a*, 208*b*, 210*a*, and 210*b*, after manipulating the tailgate device 100 into the open position 320 the user may removably attach the plurality of mounting bars 212*a* and 212*b* to the plurality of accessory rails 214*a* and 214*b*.

The rear bed divider configuration 900 may divide a rear portion of the bed 106. In examples, the rear portion of the bed 106 may be and/or include an area of the bed 106 that is behind wheel wells 902 of the vehicle 102. To place the tailgate device 100 into the rear bed divider configuration 900, a user may manipulate the tailgate device 100 into the open position 320 and detach the top panel 206 from the base 204. The user may then manipulate (or rotate/flip) the top panel 206 such that the top panel 206 is positioned within the rear portion of the bed 106 and divides the rear portion of the bed 106 (as shown by FIG. 9). The user may then removably attach the plurality of side panels 208*a*, 208*b*, 210*a*, and 210*b* to the plurality of mounting bars 212*a* and 212*b*, with the plurality of mounting bars 212*a* and 212*b* being removably attached to the plurality of accessory rails 214*a* and 214*b* (as shown by FIG. 9). In examples where the plurality of mounting bars 212*a* and 212*b* are coupled and/or integral to the plurality of side panels 208*a*, 208*b*, 210*a*, and 210*b*, after manipulating the top panel 206 such that the top panel 206 divides the rear portion of the bed 106, the user may removably attach the plurality of mounting bars 212*a* and 212*b* to the plurality of accessory rails 214*a* and 214*b*.

The front bed divider configuration 1000 may divide a front portion of the bed 106. In examples, the front portion of the bed 106 may be and/or include an area of the bed 106 that is forward of the wheel wells 902. To place the tailgate device 100 into the front bed divider configuration 1000, a user may detach the top panel 206 from the base 204 and swing the bottom side panels 210*a* and 210*b* outward such that the top side panels 208*a* and 208*b* stay folded against the top panel 206 (or vice versa, in examples). The user may then manipulate (or move) the top panel 206 such that the top panel 206 is positioned within the front portion of the bed 106 and divides the front portion of the bed 106 (as shown by FIG. 10). The user may then removably attach the bottom side panels 210*a* and 210*b* to the plurality of mounting bars 212*a* and 212*b*, with the plurality of mounting bars 212*a* and 212*b* being removably attached to the plurality of accessory rails 214*a* and 214*b* (as shown by FIG. 10). In examples where the plurality of mounting bars 212*a* and 212*b* are coupled and/or integral to the top side panels 208*a* and 208*b* or the bottom side panels 210*a* and 210*b*, after manipulating the top panel 206 such that the top panel 206 divides the front portion of the bed 106, the user may removably attach the plurality of mounting bars 212*a* and 212*b* to the plurality of accessory rails 214*a* and 214*b*. As shown by FIG. 10, the split design of the plurality of side panels 208*a*, 208*b*, 210*a*, and 210*b* allows the tailgate device 100 to be positioned over the wheel wells 902 by having the top side panels 208*a* and 208*b* (or, in examples, the bottom side panels 210*a* and 210*b*) folded against the top panel 206. The split design provides the user additional options on how to divide the bed 106.

Figures 11A, 11B:
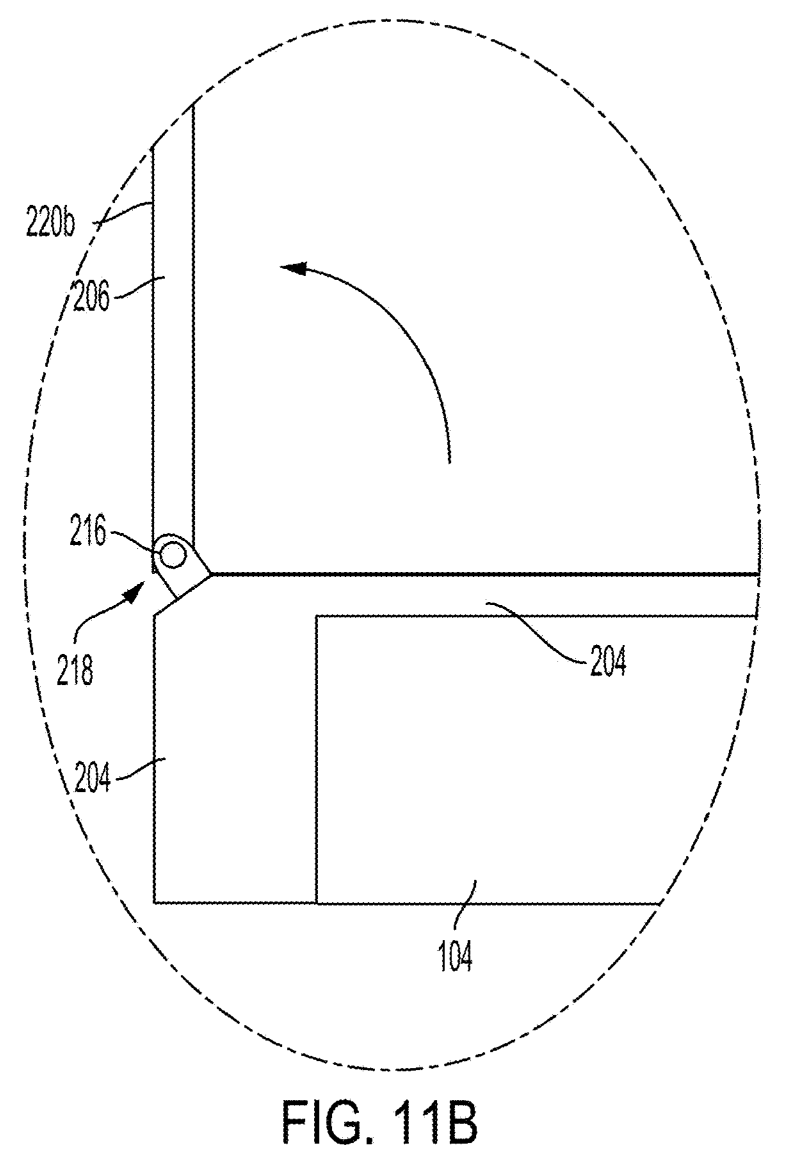
FIGS. 11A and 11B are a schematic perspective view and a schematic side view, respectively, of the tailgate device of FIG. 1 according to aspects of the disclosure.

FIGS. 11A and 11B illustrate that, in examples, the top panel 206 may be removably and moveably attached to the base 204 by the one or more hinges 216 located along the rear edge 218 of the base 204. The one or more hinges 216 may allow the top panel 206 to swing away and/or toward the base 204 such that the top panel 206 may close to cover the base 204 and open such that the left side edge 220*a* and the right side edge 220*b* of the top panel 206 are perpendicular to the left side edge 222*a* and the right side edge 222*b* of the base 204, respectively. The one or more hinges 216 may be quick disconnect hinges to allow a user to quickly detach the top panel 206 from the base 204 to place the tailgate device 100 into the rear bed divider configuration 900 (as shown by FIG. 9) and/or the front bed divider configuration 1000 (as shown by FIG. 10). To place the tailgate device 100 into the rear bed divider configuration 900 and/or the front bed divider configuration 1000, the top panel 206 may be vertically and/or horizontally flipped such that the top panel 206 faces an opposite direction as when the tailgate device 100 is in the bed extender configuration 250. When vertically and/or horizontally flipped, the plurality of side panels 208*a*, 208*b*, 210*a*, and 210*b* may switch which accessory rail of the plurality of accessory rails 214*a* and 214*b* the plurality of side panels 208*a*, 208*b*, 210*a*, and 210*b* removably attach to. In examples, the top panel 206 may be detached from the base 204 by removing or pushing a pin and/or a spring loaded pin by hand and/or with a tool (e.g., a hex key, a hexalobular wrench, etc.).

Figure 12:
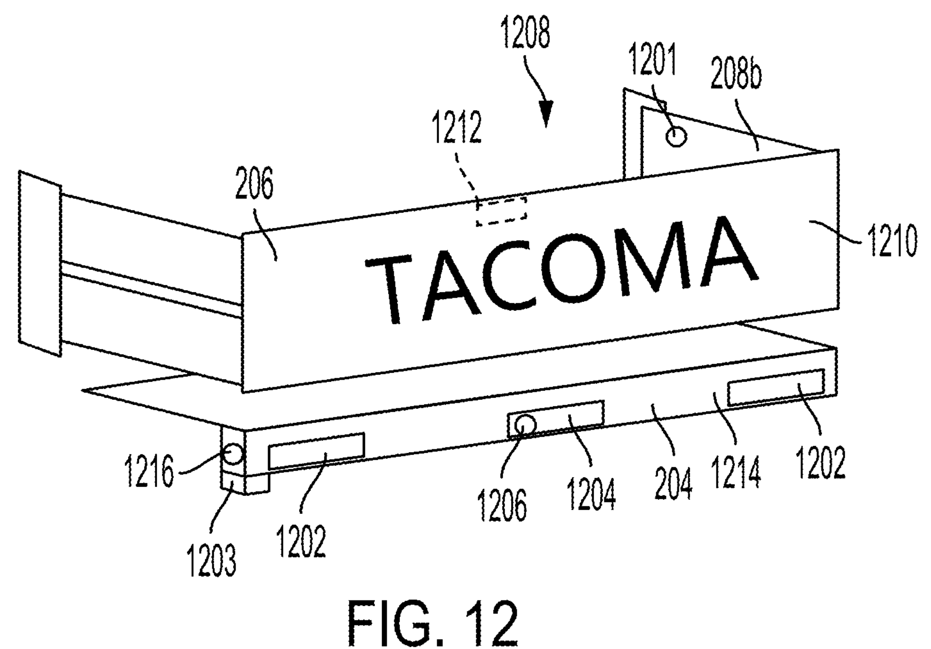
FIG. 12 is a schematic perspective view of the tailgate device of FIG. 1 according to an aspect of the disclosure.

FIG. 12 is a schematic perspective view of the tailgate device 100 without the vehicle 102 to better illustrate certain features of the tailgate device 100, in examples. With combined reference to FIGS. 1, 2, and 12, the tailgate device 100 and/or the vehicle 102 may further include one or more sensors (or position sensors) 110, one or more cameras 112, one or more lights 114, a memory 108, an electronic control unit (ECU) 136, and/or a user interface 138.

The one or more sensors 110 may be coupled to the base 204, the bed 106, and/or the tailgate 104. The one or more sensors 110 may detect and/or determine whether the tailgate 104 is in the closed state 120 or the open state 202. In examples, the one or more sensors 110 may further detect and/or determine whether the top panel 206 is folded down and against the base 204 or if the top panel 206 is folded up and outward with respect to the base 204.

The one or more cameras 112 may include a rear-view camera 1204 and/or a bed-view camera 1212. The rear-view camera 1204 may be coupled to the base 204 and may capture real-time video of a rearward view with respect to the vehicle 102. In examples, the rear-view camera 1204 may be coupled to a rearward side (or face) 1214 of the base 204. The bed-view camera 1212 may be coupled to the top panel 206 and may capture real-time video of the bed 106. In examples, the tailgate device 100 may not include the one or more cameras 112 and instead may include mounting locations for the one or more cameras 112 such that a user may choose whether to install the one or more cameras 112.

The one or more lights 114 may include one or more bed lights 1201, one or more taillights 1202, and/or one or more puddle lights 1203. The one or more bed lights 1201 may be coupled to the top panel 206 and/or any panel of the plurality of side panels 208*a*, 208*b*, 210*a*, and 210*b*. The one or more bed lights 1201 may generate light toward the bed 106. In examples, the tailgate device 100 may include one or more buttons and/or switches for controlling the one or more bed lights 1201. The one or more taillights 1202 may be at least one of a brake light, a turn signal, and/or a reverse light. The one or more taillights 1202 may be coupled to the base 204 and/or the rearward side 1214 of the base 204. The one or more taillights 1202 may electrically connect to a wire harness (or a trailer wire harness) within the tailgate 104 such that the one or more taillights 1202 function as standard taillights of the vehicle 102 when the tailgate 104 is in the open state 202. The one or more puddle lights 1203 may be coupled to the base 204 and/or an underside (or lip) of the base 204 such that the one or more puddle lights 1203 may generate light toward the ground when the tailgate 104 is in the open state 202. In examples, the tailgate device 100 may include one or more buttons and/or switches for controlling the one or more puddle lights 1203.

The memory 108 may store instructions to execute on the ECU 136 and may include one or more of a random access memory (RAM) or other volatile or non-volatile memory. The memory 108 may be a non-transitory memory or a data storage device, such as a hard disk drive, a solid-state disk drive, a hybrid disk drive, or other appropriate data storage, and may further store machine-readable instructions, which may be loaded and executed by the ECU 136. The memory 108 may store vehicle parameters (e.g., vehicle weight, transmission gear information, etc.).

The ECU 136 may be implemented as a single ECU or in multiple ECUs. The ECU 136 may be electrically connected to some or all of the components of the vehicle 102. The ECU 136 may be electrically connected to the one or more sensors 110, the one or more cameras 112, the one or more lights 114, the memory 108, and/or the user interface 138. The ECU 136 may include one or more processors (or controllers) specifically designed for controlling operations of the vehicle 102, such as accelerating, braking, lighting, etc.

In examples, the ECU 136 may determine, via the one or more sensors 110, whether the tailgate 104 is in the open state 202 or the closed state 120. When the tailgate 104 is in the open state 202, the ECU 136 may control and/or activate the one or more taillights 1202 such that the one or more taillights 1202 function as the standard taillights of the vehicle 102. This may improve the visibility of the vehicle 102 to other drivers when the tailgate 104 is in the open state 202. In examples, when the tailgate 104 is in the open state 202, the ECU 136 may control and/or activate the one or more puddle lights 1203 to illuminate the ground. In examples, when the tailgate 104 is in the open state 202, the ECU 136 may control and/or activate the rear-view camera 1204 because a standard rear-view camera of the vehicle 102 may be blocked and/or facing toward the ground when the tailgate 104 is in the open state 202.

In examples, the ECU 136 may determine, via the one or more sensors 110, whether the top panel 206 is folded against the base 204 (e.g., when the tailgate device 100 is in the stowed position 300) and/or whether the top panel 206 is swung up and outward with respect to the base 204 (e.g., when the tailgate device 100 is in the open position 320). When the top panel 206 is swung up and outward with respect to the base 204, the ECU 136 may control and/or activate the one or more bed lights 1201 to illuminate the bed 106.

The user interface 138 may be located within a cabin of the vehicle 102 and/or may be coupled to a dashboard of the vehicle 102. The user interface 138 may provide an interface to a user of the vehicle 102 to interact with and/or receive output from the ECU 136. The user interface 138 may have a user interface element, such as a screen and/or a touchscreen with a button, a switch, a microphone, a speaker, a gesture monitoring sensor, a knob, a graphical user interface (GUI), and/or other input/output devices electrically connected to the ECU 136 to provide input and/or output of information (or data) to and/or from the ECU 136. The user interface 138 may enable a user to activate or deactivate the one or more cameras 112 and/or the one or more lights 114. The user interface 138 may include one or more displays to display real-time video received from the rear-view camera 1204 and/or the bed-view camera 1212.

In examples, the tailgate device 100 may further include a power and ground port (or a trailer wiring port) 1206 coupled to the base 204 and/or the rearward side 1214 of the base 204 to provide a user a convenient location to plug in trailer wires and/or other accessories that require power.

In examples, the tailgate device 100 may further include one or more logos 1208 on a rearward face 1210 of the top panel 206. The one or more logos 1208 may be prominently displayed when the tailgate device 100 is in the bed extender configuration 250.

In examples, the tailgate device 100 may further include a flashlight (or accessory) bay 1216. The flashlight bay 1216 may be located within the base 204. The flashlight bay 1216 may house and/or charge a flashlight.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A tailgate device for a vehicle, comprising:
- a left wall, a right wall, and a front wall defining a truck bed, the truck bed having:
  - a rear end portion opposite of the front wall, and
  - a left accessory rail coupled to the left wall and a right accessory rail coupled to the right wall;
- a tailgate coupled to the rear end portion of the truck bed and having an interior surface, the tailgate being configured to close to enclose the truck bed and open such that the tailgate does not enclose the truck bed;
- a base panel coupled to the interior surface such that the base panel covers the interior surface, the base panel having a left side edge and a right side edge opposite the left side edge;
- a top panel moveably attached to the base panel and having a left side edge and a right side edge opposite the left side edge, the top panel being configured to:
  - close such that the top panel covers the base panel, and
  - open such that the left side edge and the right side edge of the top panel are perpendicular to the left side edge and the right side edge of the base panel, respectively;
- one or more left side wings moveably coupled to the left side edge of the top panel and configured to:
  - close by swinging toward the top panel and open by swinging away from the top panel, and
  - removably attach to the left accessory rail when open; and
- one or more right side wings moveably coupled to the right side edge of the top panel and configured to:
  - close by swinging toward the top panel and open by swinging away from the top panel, and
  - removably attach to the right accessory rail when open.

2. The tailgate device of claim 1, wherein the tailgate device has a bed extender configuration that extends the truck bed when:
- the tailgate is open;
- the top panel is open;
- the one or more left side wings are open and removably attached to the left accessory rail; and
- the one or more right side wings are open and removably attached to the right accessory rail.

3. The tailgate device of claim 1, wherein:
- the base panel includes a rear edge and a front edge opposite the rear edge;
- the top panel is removably attached to the rear edge of the base panel;
- the top panel is further configured to detach from the base panel;
- the one or more left side wings are further configured to removably attach to the right accessory rail; and
- the one or more right side wings are further configured to removably attach to the left accessory rail.

4. The tailgate device of claim 3, wherein:
- the top panel has an interior face that faces toward the front wall when the tailgate is open and the top panel is open; and
- the tailgate device has a rear bed divider configuration that divides a rear portion of the truck bed when:
  - the top panel is detached from the base panel,
  - the top panel is positioned such that the top panel is located within the truck bed and the interior face of the top panel faces away from the front wall,
  - the one or more left side wings are open and removably attached to the left accessory rail or the right accessory rail; and the one or more right side wings are open and removably attached to the right accessory rail or the left accessory rail.

5. The tailgate device of claim 3, wherein:
the one or more left side wings include a first left side wing and a second left side wing that is separate from the first left side wing;
the one or more right side wings include a first right side wing and a second right side wing that is separate from the first right side wing.

6. The tailgate device of claim 5, wherein:
the top panel has an interior face that faces toward the front wall when the tailgate is open and the top panel is open; and
the tailgate device has a front bed divider configuration that divides a front portion of the truck bed when:
the top panel is detached from the base panel,
the top panel is positioned such that the top panel is located within the front portion of the truck bed and the interior face of the top panel faces away from the front wall,
the first left side wing or the second left side wing is open and removably attached to the left accessory rail or the right accessory rail; and
the first right side wing or the second right side wing is open and removably attached to the left accessory rail or the right accessory rail.

7. The tailgate device of claim 1, wherein the top panel, the base panel, the one or more left side wings, and/or the one or more right side wings include one or more embossed sections.

8. The tailgate device of claim 7, wherein:
the tailgate includes one or more service holes; and
the one or more embossed sections of the bottom panel align with the one or more service holes of the tailgate.

9. The tailgate device of claim 1, wherein the tailgate device is in a stowed position such that the tailgate device is folded against the tailgate when:
the one or more left side wings are closed;
the one or more right side wings are closed; and
the top panel is closed.

10. The tailgate device of claim 1, further comprising at least one of:
one or more taillights coupled to the base panel;
one or more puddle lights coupled to the base panel;
one or more bed lights coupled to the top panel, the one or more left side wings, and/or the one or more right side wings; or
one or more cameras coupled to the base panel and/or the top panel.

11. A tailgate device for a vehicle, comprising:
a truck bed having a plurality of accessory rails coupled to sides of the truck bed;
a plurality of adapters configured to removably attach to the plurality of accessory rails;
a tailgate having an interior surface and configured to open and close;
a base panel coupled to the interior surface and having a left side edge and a right side edge opposite the left side edge;
a top panel moveably coupled to the base panel and having a left side edge and a right side edge opposite the left side edge, the top panel being configured to:
close such that the top panel covers the base panel, and open such that the left side edge and the right side edge of the top panel are perpendicular to the left side edge and the right side edge of the base panel, respectively;
one or more left side wings moveably coupled to the left side edge of the top panel and configured to:
close by swinging toward the top panel and open by swinging away from the top panel, and
removably attach, via an adapter of the plurality of adapters, to an accessory rail of the two or more accessory rails when the one or more left side wings are open; and
one or more right side wings moveably coupled to the right side edge of the top panel and configured to:
close by swinging toward the top panel and open by swinging away from the top panel, and
removably attach, via another adapter of the plurality of adapters, to another accessory rail of the two or more accessory rails when the one or more right side wings are open.

12. The tailgate device of claim 11, wherein the tailgate device has a bed extender configuration that extends the truck bed when:
the tailgate is open;
the top panel is open;
the one or more left side wings are open and removably attached to the accessory rail; and
the one or more right side wings are open and removably attached to the another accessory rail.

13. The tailgate device of claim 11, wherein:
the base panel includes a rear edge and a front edge opposite the rear edge;
the top panel is removably attached to the rear edge of the base panel;
the top panel is further configured to detach from the base panel.

14. The tailgate device of claim 13, wherein:
the top panel has an interior face that faces forward with respect to the vehicle when the tailgate is open and the top panel is open; and
the tailgate device has a rear bed divider configuration that divides a rear portion of the truck bed when:
the top panel is detached from the base panel,
the top panel is positioned such that the top panel is located within the truck bed and the interior face of the top panel faces rearward with respect to the vehicle,
the one or more left side wings are open and removably attached to the accessory rail; and
the one or more right side wings are open and removably attached to the another accessory rail.

15. The tailgate device of claim 13, wherein:
the one or more left side wings include a first left side wing and a second left side wing that is separate from the first left side wing;
the one or more right side wings include a first right side wing and a second right side wing that is separate from the first right side wing.

16. The tailgate device of claim 15, wherein:
the top panel has an interior face that faces forward with respect to the vehicle when the tailgate is open and the top panel is open; and
the tailgate device has a front bed divider configuration that divides a front portion of the truck bed when:
the top panel is detached from the base panel, the top panel is positioned such that the top panel is located within the front portion of the truck bed and the interior face of the top panel faces rearward with respect to the vehicle, the first left side wing or the second left side wing is open and removably attached to the accessory rail; and the first right side wing or the second right side wing is open and removably attached to the another accessory rail.

17. The tailgate device of claim 11, wherein the top panel, the base panel, the one or more left side wings, and/or the one or more right side wings include one or more embossed sections.

18. The tailgate device of claim 17, wherein:

the tailgate includes one or more service holes; and the one or more embossed sections of the bottom panel align with the one or more service holes of the tailgate.

19. The tailgate device of claim 11, wherein the tailgate device is in a stowed position such that the tailgate device is folded against the tailgate when:

the one or more left side wings are closed;

the one or more right side wings are closed; and the top panel is closed.

20. The tailgate device of claim 11, further comprising at least one of:

one or more taillights coupled to the base panel;

one or more puddle lights coupled to the base panel;

one or more bed lights coupled to the top panel, the one or more left side wings, and/or the one or more right side wings; or one or more cameras coupled to the base panel and/or the top panel.

* * * * *